(12) United States Patent
George et al.

(10) Patent No.: US 6,361,893 B1
(45) Date of Patent: Mar. 26, 2002

(54) PLANAR FUEL CELL UTILIZING NAIL CURRENT COLLECTORS FOR INCREASED ACTIVE SURFACE AREA

(75) Inventors: Thomas J. George, Star City, WV (US); G. B. Kirby Meacham, Shaker Heights, OH (US)

(73) Assignee: The United States of America as represented by the Department of Energy, Washington, DC (US)

( * ) Notice: Subject to any disclaimer, the term of this patent is extended or adjusted under 35 U.S.C. 154(b) by 0 days.

(21) Appl. No.: 09/449,768

(22) Filed: Nov. 26, 1999

(51) Int. Cl.[7] ............... H01M 8/10; H01M 2/00; H01M 2/20
(52) U.S. Cl. ............... 429/31; 429/27; 429/34; 429/44
(58) Field of Search ............... 429/27, 31, 34, 429/44

(56) References Cited

U.S. PATENT DOCUMENTS 4,476,198 A * 10/1984 Ackerman et al. ............ 429/32
5,009,763 A *  4/1991 Hise ........................... 204/255

* cited by examiner

Primary Examiner—Gabrielle Brouillette
Assistant Examiner—Tracy Dove
(74) Attorney, Agent, or Firm—George W. Moxon, II; Brouse McDowell

(57) ABSTRACT

A plurality of nail current collector members are useful in the gas flow passages of an electrochemical device to optimize the active surfaces of the device and to provide structural support. In addition, the thicknesses of cathode and anode layers within the electrochemical device are varied according to current flow through the device to reduce resistance and increase operating efficiency.

21 Claims, 5 Drawing Sheets

PLANAR FUEL CELL UTILIZING NAIL CURRENT COLLECTORS FOR INCREASED ACTIVE SURFACE AREA

CONTRACTUAL ORIGIN OF THE INVENTION

The United States Government has rights in this invention pursuant to the employer-employee relationship of between the U.S. Department of Energy and the inventors.

TECHNICAL FIELD

This invention relates generally to electrochemical devices and is particularly directed to improvements in the available active surface area of as lid state fuel cell.

BACKGROUND OF INVENTION

Fuel cells are electrochemical systems that generate electric al current by chemically reacting a fuel gas and an oxidant gas on the surface of electrodes. Conventionally, the components of a single fuel cell include the anode, the cathode, the electrolyte, and the interconnect material. In a solid state fuel cell, such as solid oxide fuel cells (SOFCs), the electrolyte is in a solid form and insulates the cathode, and anode one from the other with respect to electron flow, while Permitting oxygen ions to flow from the cathode to the anode, and the interconnect material electronically connects the anode of one cell with the cathode of an adjacent cell, in series, to generate a useful voltage from an assembled fuel cell stack. The SOFC process gases, which include natural or synthetic fuel gas (i.e., those containing hydrogen, carbon monoxide or methane) and an oxidant (i.e., oxygen or air), react on the active electrode surfaces of the cell to produce electrical energy water vapor and heat.

Several configurations for solid state fuel cells have been developed, including the tubular, flat plate, and monolithic designs. In a tubular, design, each single fuel cell includes electrode and electrolyte layers applied to the periphery of a porous support tube. While the inner cathode layer completely surrounds the interior of the support tube, the solid electrolyte and outer anode layers are discontinuous to provide a space for the electrical interconnection of the single fuel cell to the exterior surface of adjacent, parallel cells. Fuel gas is directed over the exterior of the tubular cells, and oxidant gas is directed through the interior of the tubular cells.

The flat plate design incorporates the use of electrolyte sheets which are coated on opposite sides with layers of anode and cathode material Ribbed distributors may also be provided on the opposite sides of the coated electrolyte sheet to form flow channels for the reactant gases. A conventional cross flow pattern is constructed when the flow channels on the anode side of the electrolyte are perpendicular to those on the cathode side. Cross flow patterns, a opposed to co-flow patterns where the flow channels for the fuel gas and oxidant gas are parallel, allow for simpler, more conventional manifolds to be incorporated into the fuel cell structure. A manifold system delivers the reactant gases to the assembled fuel cell. The coated electrolyte sheets and distributors of the flat plate design are tightly stacked between current conducting bipolar plates. In an alternate flat plate design, uncoated electrolyte sheets are stacked between porous plates of anode, cathode, and interconnecting material, with gas delivery tubes extending through the structure.

The monolithic solid oxide fuel cell (MSOFC) design is characterized by a honeycomb structure. The MSOFC is constructed by tape casting or calendar rolling the sheet components of the cell, which include thin composites of node-electrolyte-cathode (A/E/C) material and anode-interconnect-cathode (A/I/C) material. The sheet components are corrugated to form co-flow channels, wherein the fluid gas flows through channels formed by the anode layers, and the oxidant gas flows through parallel channels formed by the cathode layers. The monolithic structure, comprising many single cell layers, is assembled in a green or unfired state and co-sintered to fuse the materials into a rigid, dimensionally stable SOFC core.

These conventional designs have been improved upon in the prior art to achieve higher power densities. Power density is increased by incorporating smaller single unit cell heights and shorter cell-to-cell electronic conduction paths. SOFC designs have thus incorporated thin components which are fused together to form a continuous, bonded structure. However, the large number of small components, layers, and interconnections, in addition to complex fabrication steps, decreases the reliability of operational fuel cells. In addition, any given fuel cell design must be commercially viable as an alternative power generating device, and therefore, factors affecting the economics of power generation by electrochemical activity, such as overall capital and operational costs to the user, must be comparable to those of conventional power generating systems.

The present invention is directed to improving the available active surface in a solid state fuel cell having a unique planar tube-sheet design. Accordingly, a fuel cell stack is constructed from individual planar sheets of integrally connected, parallel tubes. The fuel cell stack is assembled by stacking the individual planar tube-sheets, such that the tubes within each sheet conduct a first process gas horizontally through the fuel cell stack, and spaces formed between adjacent stacked sheets define gas flow passages for conducting a second process gas horizontally through the fuel cell stack. A novel nail current collector member is positioned within each tube to significantly increase the active surface area of the fuel cell stack. This solid state fuel cell design is a viable technology for future commercial installations.

Therefore, an object of the present invention is to provide a solid state fuel cell design incorporating nail current collector members to increase the active surface area per unit fuel cell, such that the overall power density of the assembled fuel cell system is critically improved.

Another object of the present invention is to simplify the construction of an assembled fuel cell system by forming and stacking planar sheets of integrally connected tubular fuel cells, preferably manufactured by a single extrusion step.

Yet another object of the present invention is to increase current flow within the fuel cell system by graduating the thicknesses of the electrode structures of the planar sheets of integrally connected tubes, according to the direction of the current flow through the fuel cell stack.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of instrumentation and combinations particularly pointed out in the appended claims.

BRIEF SUMMARY OF THE INVENTION

Briefly, this invention is a solid state electrochemical device that incorporates nail current collector members into a monolithic fuel cell assembly constructed from stacking planar sheets of integrally connected tubular fuel cells. The design significantly increases the available active surface area per unit fuel cell to achieve greater power densities.

Individual planar sheets are each composed of a series of parallel, longitudinal tubes that are integrally connected along their lengths to define the sheet. The individual planar sheets of integrally connected tubular fuel cells are preferably fabricated from cathode material, and easily and economically manufactured by a single extrusion step. The tubes have open ends for receiving and discharging an electrochemical process gas. The bottom surface of the planar sheet is a substantially flat surface, while the top surface of the planar sheet is defined by protruding, longitudinal ridges created by the top surfaces of the parallel tubes. The planar sheets are preferably manufactured from a cathode material, and continuous layers of electrolyte and anode material are applied in series to the top surface of the planar sheet, while discontinuous layers electrolyte and anode material are applied in series to the planar sheet bottom surface. The bottom surface layers of electrolyte and anode material are interrupted by strips of interconnect material that are applied to the planar sheet bottom surface, such that the interconnect strips extend from one opposing edge of the sheet to the other, between each adjacent tube within the sheet.

The solid state electrochemical device is assembled by uniformly stacking the individual, planar sheets, such that all tubes are parallel and the points of contact between adjacent sheets is limited to the interconnect strips of an upper sheet contacting and being supported by the anode layer covering the ridges on the top surface of a lower sheet. In operation, the tubes define oxidant gas flow passages extending horizontally through the assembled fuel cell stack, and the longitudinal passages formed between adjacent, stacked planar sheets define fuel gas flow passages extending horizontally through the assembled fuel cell stack.

A critical feature of the invention is the inclusion of a nail current collector member within the planar tube-sheet design. The nail current collector member is an electronically conducting member that traverses an individual tube to connect the top surface anode layer and the bottom surface anode layer of the tube. The nail current collector member is electronically insulated from the cathode material and electrolyte layers by insulator members or by a dielectric coating. Incorporation of the nail current collector member optimizes the active cathode-electrolyte-anode surfaces of the assembled planar tube-sheet fuel cell design by connecting the top and bottom surfaces of each tubular fuel cell. The nail current collector member also provides structural support to the assembled fuel cell stack.

Another feature of the invention is the variation of the thicknesses of the cathode body and the anode layers about the circumference of the tubes within the planar sheets, according to the direction of current flow upwardly through the fuel cell stack. Varying the thickness of the electrode materials the reduces resistance of the current path.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

DETAILED DESCRIPTION OF THE INVENTION

The present invention relates to a solid state fuel cell design that optimizes the active cathode-electrolyte-anode surfaces of an assembled fuel cell stack. The present invention is described with respect to a detailed description of its application in the operation of a solid state fuel cell having a solid oxide electrolyte: a solid oxide fuel cell (SOFC). However, it will be obvious to those skilled in the art from the following detailed description that the invention is likewise applicable to any electrochemical system, including electrolysis cells, heat exchangers, chemical exchange apparatuses, and oxygen generators, among other applications.

Figure 1:
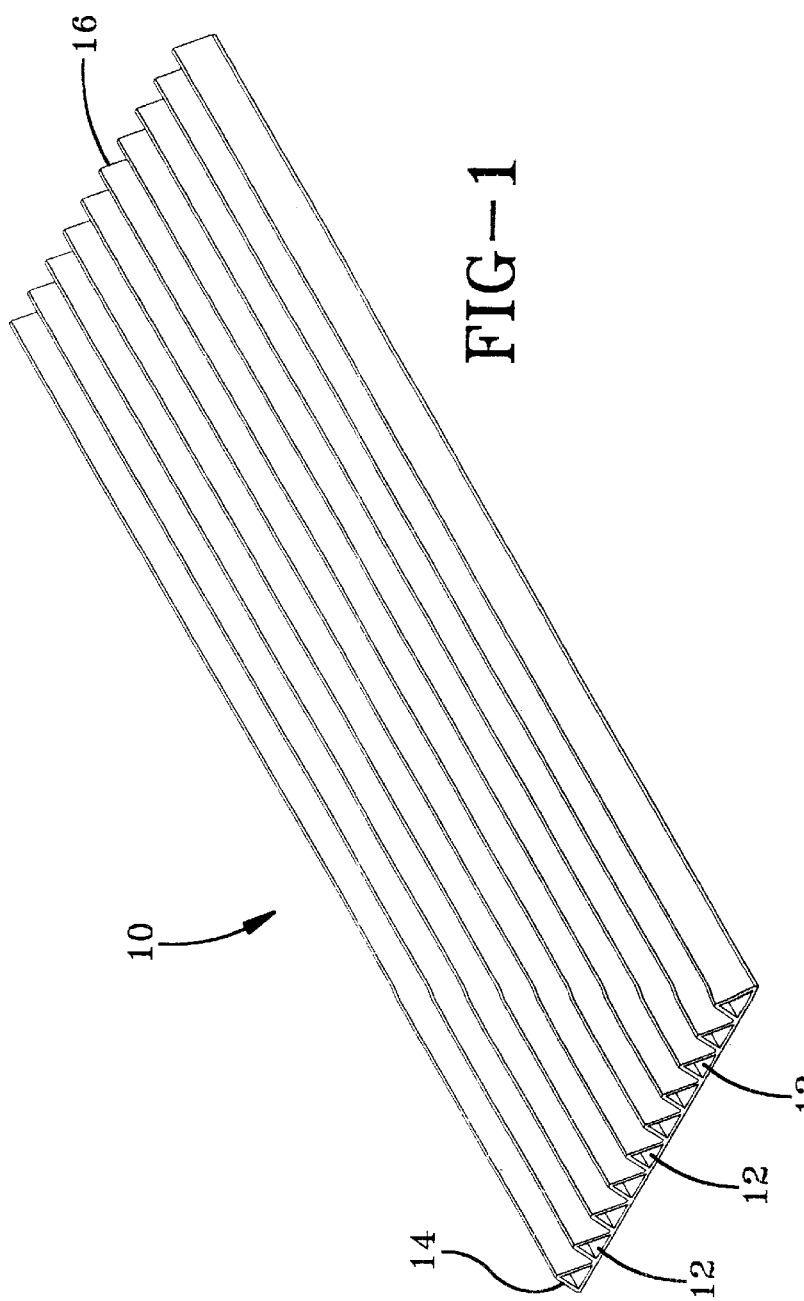
FIG. 1 is an illustration of a single planar sheet of integrally connected tubes.
Figure 2:
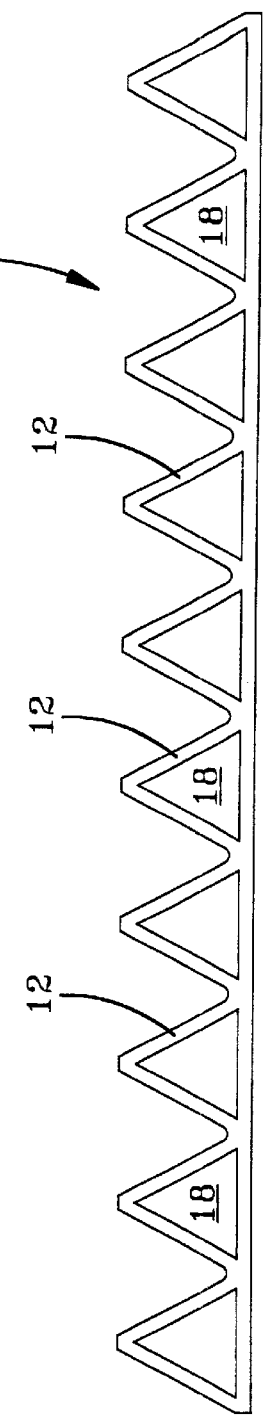
FIG. 2 is a cross-sectional view of the planar sheet illustrated in FIG. 1.

FIG. 1 shows an individual planar sheet 10 of integrally connected tubes 12, according to the present invention. The sheet 10 may be constructed from any fuel cell component material, e.g., cathode, anode, electrolyte, or interconnect material, or a combination thereof Preferably, the sheet 10 is made from cathode material in a single extrusion step. The sheet 10 is substantially planar and is composed of parallel rows of longitudinally aligned tubes 12 that extend the length of the sheet 10, from a first edge 14 of the sheet to an opposing second edge 16. Each tube 12 is integrally connected along its length either directly to an adjacent tube 12 or to a connecting member (not shown) between adjacent tubes 12, to form and define the planar tube-sheet 10. All of the tubes 12 are open at the opposing edges 14, 16 of the sheet 10 for receiving and discharging a process gas.

If the sheet is extruded from cathode material, a continuous electrolyte layer is applied to the top surface of the sheet, followed by the application of a continuous layer of anode material covering the electrolyte layer. The cathode-electrolyte-anode composite forms the active surface areas of the fuel cell. Similarly, layers of electrolyte and anode material are applied in series to the bottom surface of the sheet, however, the bottom electrolyte-anode layers are interrupted by interconnect strips applied between the tubes to the bottom surface of the sheet, such that the strips are parallel to the tubes and extend from the first to the second edge of the sheet.

Alternate methods of constructing the sheets of integrally connected tubes are contemplated, including extrusion of the anode material and application of electrolyte and cathode layers on the interior surfaces of the tubes. Also, extrusion of all of the fuel cell components in a single extrusion step is foreseeable, with the advance of manufacturing technologies. An advantage of fabricating the tube sheets by extrusion is that the tube sheet is a fired, structurally stable monolith, such that thin films of electrolyte, anode and interconnect material may be applied to the fired structure, and the application of thick layers of material is avoided. The tubes may be symmetrical or asymmetrical, and may have cross-sections that are triangular, rectangular, trapezoidal, or polygonal in shape, among other geometries.

Figure 3:
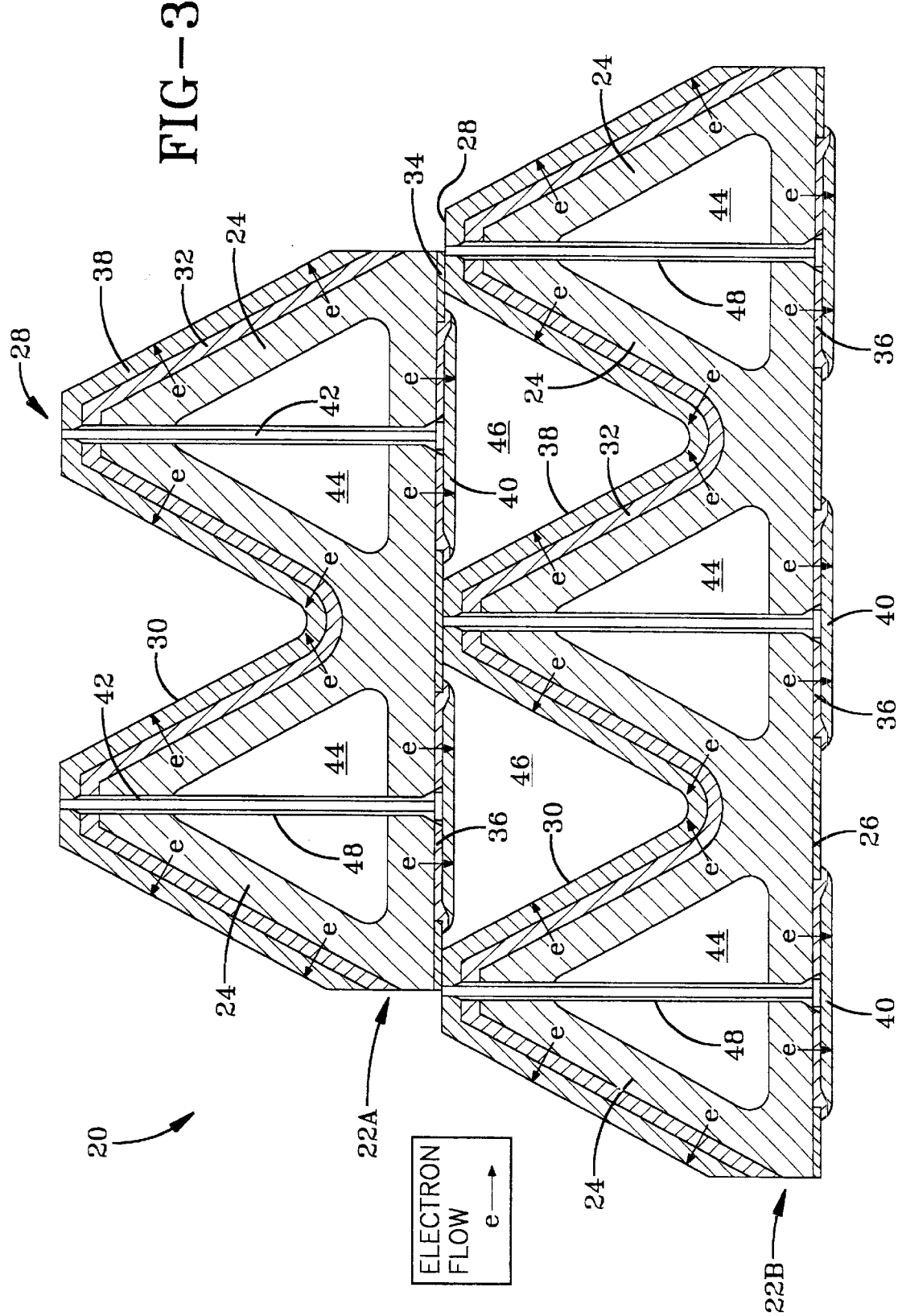
FIG. 3 is an illustration of an assembled fuel cell stack constructed by stacking planar sheets of integrally connected tubes, including nail current collector members disposed within the tubes.

FIG. 3 illustrates an embodiment of a fuel cell stack according to the present invention. Cathode material is extruded to form upper and lower sheets 22A, 22B composed of tubes 24 having equilateral triangular cross-sections with sides of about 11 mm in length. Each side of every tube 24 that defines the base of the triangular cross-section is substantially within the same plane and is integrally connected along its length with an adjacent tube, such that these base sides of the triangular tubes 24 together define a continuous bottom surface 26 of the planar tube-sheets 22A, 22B. The vertices 28 of the triangular tubes 24 form longitudinal ridges along the length of the planar tube-sheets 22A, 22B that protrude from the top surface 30 of the planar tube-sheets 22A, 22B.

Interconnect strips 34 are applied to the bottom surface 26 of the planar tube sheets 22A, 22B between each adjacent triangular tube 24, such that the interconnect strips 34 are parallel to the tubes 24 and extend the length of the planar tube sheet 22A, 22B. A continuous electrolyte coating 32 is applied to the top surface 30 of the planar tube-sheets 22A, 22B, and discontinuous electrolyte coatings 36 are applied to the bottom surface 26 of the planar tube-sheets 22A, 22B between (and preferably overlapping a fraction of) the interconnect strips 34. An anode coating 38 is applied to cover the electrolyte coating 32 on the top surface 30 of the planar tube-sheets 22A, 22B, and an anode coating 40 is applied to cover the electrolyte coating 36 on the bottom surface 26 of the planar tube-sheets 22A, 22B, however, the anode coating 40 is not in contact with the interconnect strip 34.

The sheets 22A, 22B are stacked to form a fuel cell assembly 20, such that all tubes are substantially parallel and the coated vertices 28 of the triangular cross-sections of a first lower planar tube-sheet 22B contact the interconnect strips 34 of the adjacent upper tube-sheet 22A. The tubes 24 define gas flow passages 44 for conducting a first reactant gas (e.g., oxidant), and gas flow passages 46 formed between adjacent stacked sheets 22A, 22B conduct a second reactant gas (e.g., fuel gas). A critical step in the assembly of the fuel cell stack is the alignment of the sheets 22A, 22B, such that the anode layer 38 of the top surface of a lower sheet 22B is in contact with the interconnect strip 34 of an adjacent, upper sheet 22A. This point of contact forms an electrical bond between adjacent sheets.

Table I below lists operating characteristics of the planar tube-sheet fuel cell assembly having interior equilateral triangular tube cross-sections of 2 mm in height.

TABLE I

| | |
|---|---|
| Active area per unit volume | 6.87 square cm/cubic cm |
| Grams per unit active area | 0.348 grams/square cm |
| Material weight | 1.42 kilograms/kilowatt |
| Liters per kilowatt | 0.60 |
| Material cost | 21.87 dollars/kilowatt |

TABLE I-continued

| | |
|---|---|
| Anode pressure drop | 0.013 psi |
| Cathode pressure drop | 1.136 psi |
| Resistive loss | 5.8 millivolts at 300 ma per square cm |

Generally, the preferred cross-sectional area of the tubular gas flow passages is determined by pressure drop calculations across the fuel cell stack. The tubular gas flow passages usually conduct volumetrically more oxidant than the gas flow passages (not shown) conducting fuel between adjacent sheets. The triangular gas flow passages preferably have equilateral sides having lengths in the range of between about 2 mm and about 20 mm. The thickness of the tubes constructed from cathode material is at least 0.50 mm, with a preferred thickness in the range of between about 1.0 mm to about 1.5 mm. The thickness of the electrolyte layer is preferably 125 microns. Specific planar sheet geometries are a function of the following fuel cell stack characteristics: resistance to gas flow (pressure drop), resistance to current flow, limitations of manufacturing process, and structural and electrochemical considerations, among others.

A critical element of the present invention is at least one nail current collector member disposed within one or a plurality of the tubes of the planar tube-sheets. The nail current collector member is an electronically conducting member that is approximately perpendicular to the bottom surface of the planar sheet and traverses an individual tube to connect the top surface anode layer of the tube and the bottom surface anode layer of the tube, such that the bottom surface of the planar tube-sheets are active anode-electrolyte-cathode composites. The nail current collector member, therefore, necessarily passes through the planar tube-sheet top surface electrolyte layer and the thickness of the cathode material along the protruding ridge, as well as the thickness of the cathode material of the planar tube-sheet bottom surface and the electrolyte layer applied to the planar tube-sheet bottom surface.

The nail current collector member is any electronically conducting member that connects the opposing anode layers of a planar tube-sheet, and, for example, may be a pointed cylinder, or a plurality of pencil-like members positioned along the interior length of the tube, among other embodiments. The nail current collector member must be electronically insulated from the cathode material and electrolyte layers through which it passes. Generally, the nail current collector members are spaced along the length of the each tube at a distance approximately equal to the width of the tube, in the range of between about every 5 to mm to about 50 mm. Incorporation of the nail current collector member optimizes the active surfaces of the assembled planar tube-sheet fuel cell design, and also provides additional structural support to the fuel cell system.

FIG. 3 shows nail current collector members 42 is disposed within a plurality of the triangular tubes 24. As described above, the nail current collector members extend from the bottom surface anode coating 40, through the cathode tubular body 24 and oxidant gas passage 44 defined by the tube 24, and through the top surface electrolyte 32 and anode 38 coatings, such that the nail current collector member 42 contacts the interconnect strip 34 of an upper sheet upon assembly. Either an insulating member (not shown) or a dielectric coating 48 insulates the nail current collector member 42 from any cathode materials 24 and electrolyte layers 32, 36. Advantageously, the nail current collector member increases the active perimeter of each tube by connecting the top and bottom anode surfaces of the tube.

Figure 4:
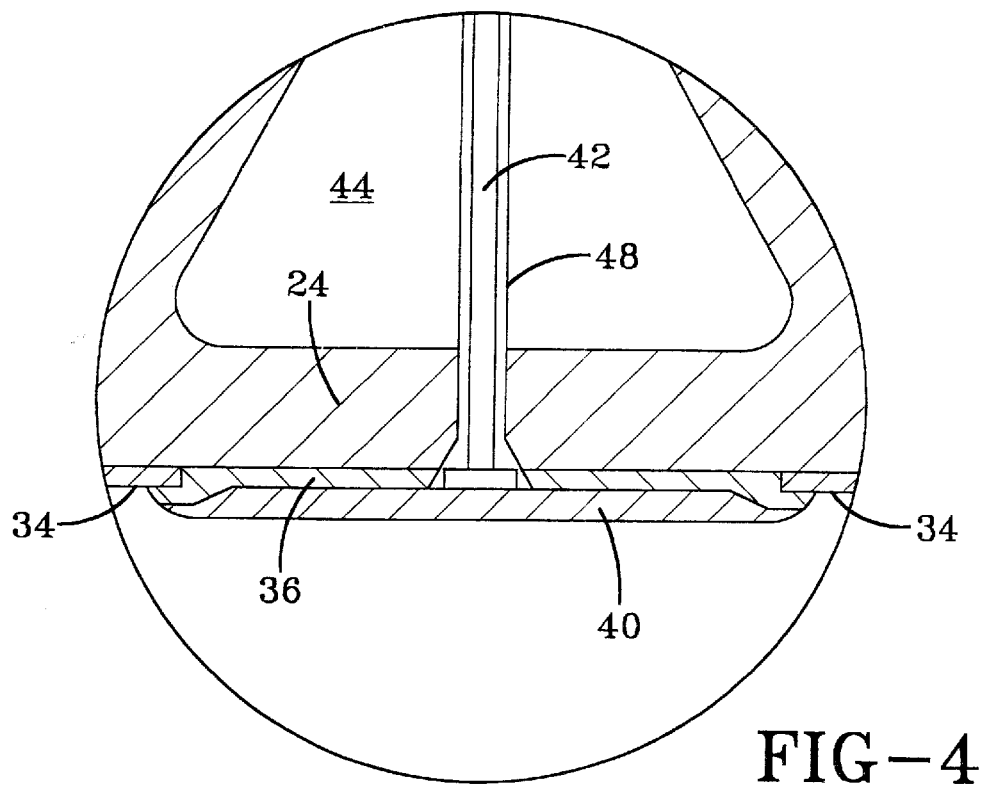
FIG. 4 is an enlarged view of the connection between a nail current collector member and a bottom anode layer.
Figure 5:
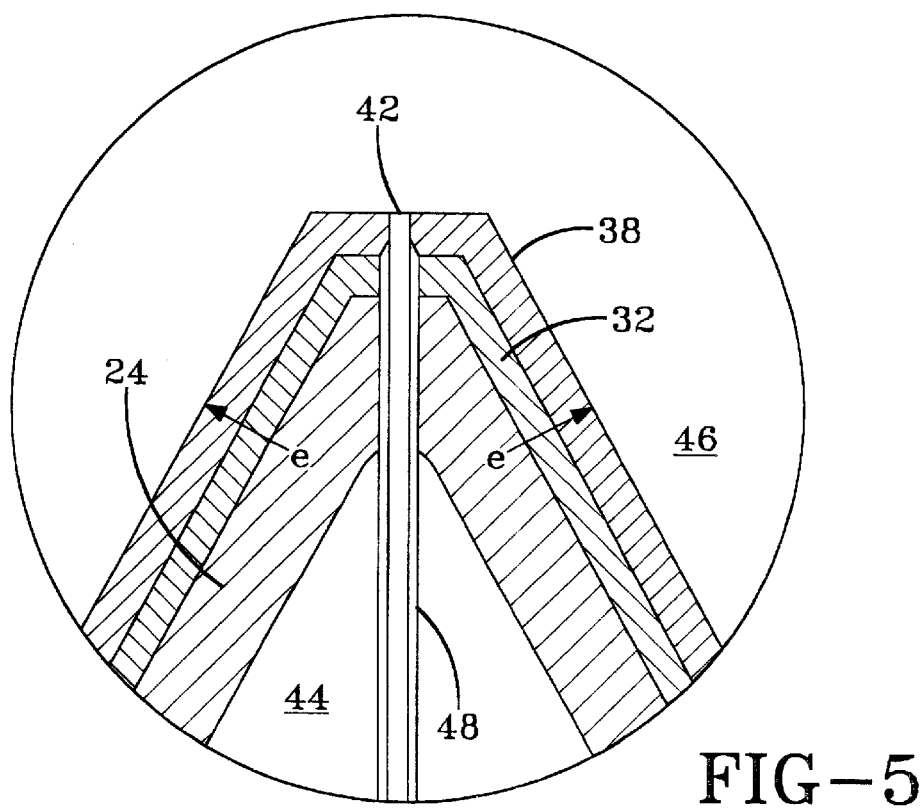
FIG. 5 is an enlarged view of the connection between a nail current collector member and a top anode layer.

FIGS. 4 and 5 show enlarged views of the bottom and top ends of a nail current collector member, respectively, within a tube of a planar sheet. In FIG. 4, the dielectric coated nail current collector member 42 contacts the bottom surface anode layer 40, and traverses the bottom surface electrolyte layer 36, the cathode tube 24, and the oxidant gas flow passage 44. The nail current collector member 42 is isolated from the electrolyte layer 36 and cathode tube 24 through which it passes by the dielectric coating 48. In FIG. 5, the dielectric coated nail current collector member 42 is shown to traverse the oxidant gas flow passage 44, the cathode tube 24, the top surface electrolyte layer 32, and the top surface anode layer 38. The nail current collector member 42 is may be exposed at the top surface of the tube 24 for contacting an adjacent sheet. Again, the dielectric coating 48 isolates the nail current collector member 42 from the cathode tube 24 and the top surface electrolyte layer 32.

Another feature of the invention involves graduating the thicknesses of the anode and cathode components of the planar sheets according to the direction of the current flow through the tubular fuel cell. In the embodiments shown in FIGS. 3, 6 and 7, electrons generated by the fuel cell chemical reactions flow between adjacent sheets from the lower sheet to the upper sheets, in the direction of the interconnect strip. Therefore, for each sheet, the top anode layer becomes gradually thicker in the direction of current flow (i.e., toward the interconnect strip of an adjacent upper sheet), such that the top anode layer is at a maximum thickness at the electrical bond between the top anode layer and the interconnect strip. The top anode layer becomes gradually thinner along the sides of the tubes and is at a minimum thickness between adjacent tubes within the sheet. Conversely, the cathode material comprising the tubes within a sheet becomes gradually thinner in the direction of current flow (i.e., toward the interconnect strip of an adjacent upper sheet), such that the cathode material is at a minimum thickness at the point of closest proximity to the electrical bond between the top anode layer of the sheet and the interconnect strip of an adjacent upper sheet. The cathode material becomes gradually thinner at the sides of the tubes and is at a maximum thickness at the base of the tubes and along the bottom of the sheet. Such variation reduces resistance losses as current flows through the fuel cell system.

Figure 6:
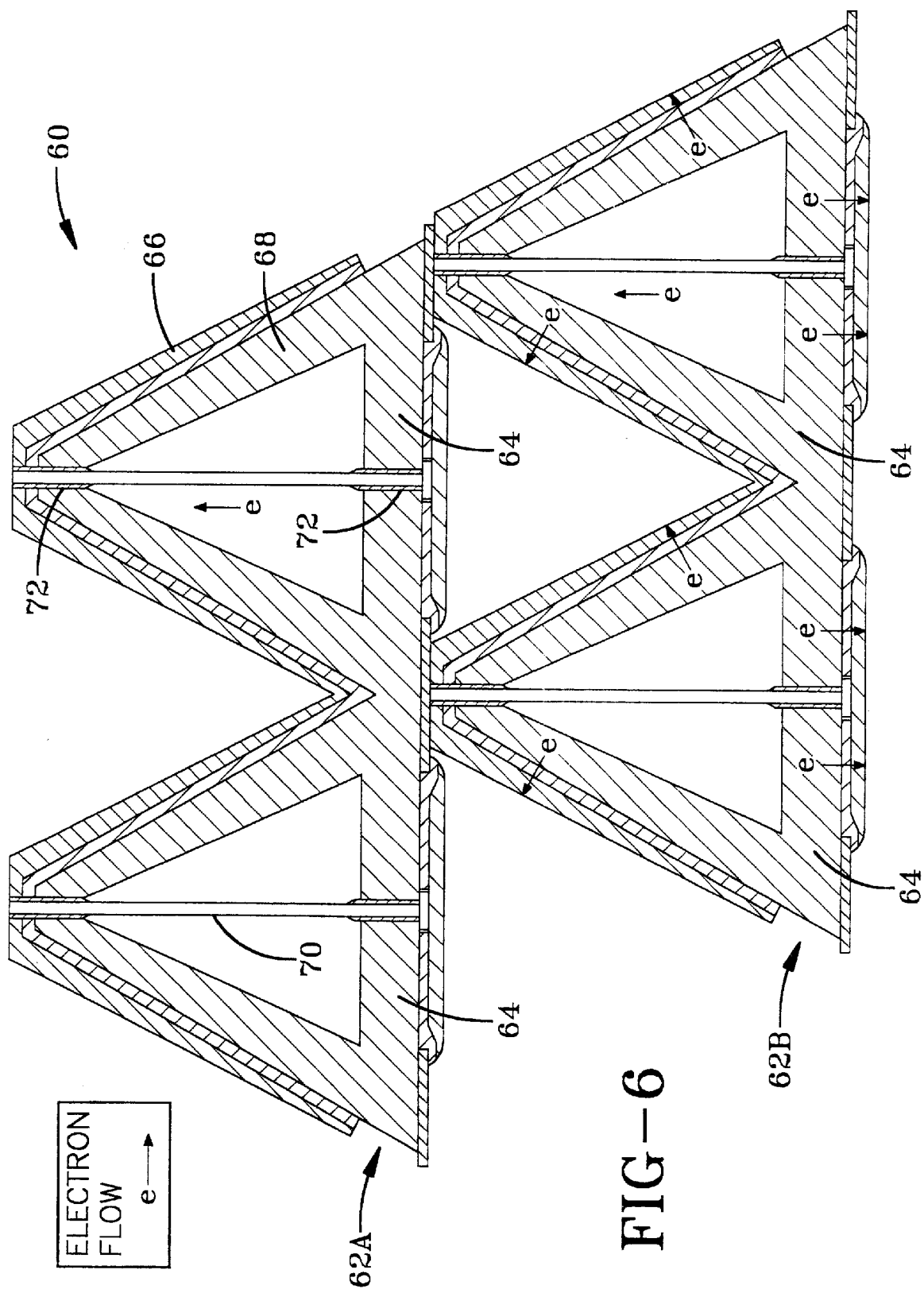
FIG. 6 is an illustration of an assembled fuel cell stack constructed by stacking planar sheets of integrally connected tubes, including nail current collector members disposed within the tubes and graduated electrode thicknesses.

FIG. 6 illustrates the stacked planar sheet configuration 60 of an upper planar sheet 62A of integrally connected tubes 64 and a lower planar sheet 62B of integrally connected tubular fuel cells 64. Also shown is the graduated thicknesses of the anode layer 66 and the cathode material 68 comprising the tubes 64. In this embodiment, the nail current collector members 70 are isolated from the fuel cell components by insulating members 72.

Figure 7:
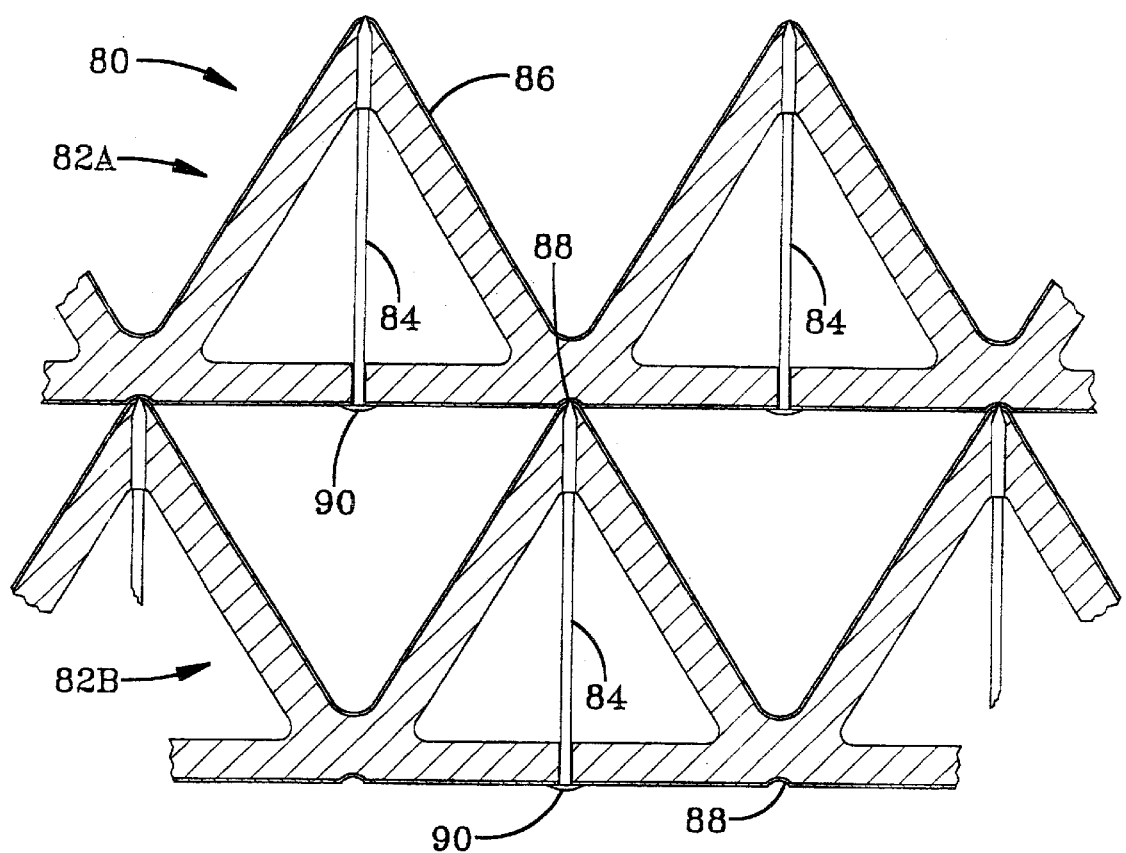
FIG. 7 is an illustration an assembled fuel cell stack constructed by stacking planar sheets of integrally connected tubular fuel cells, including nail current collector members and cup-shaped interconnect members.
Figure 8:
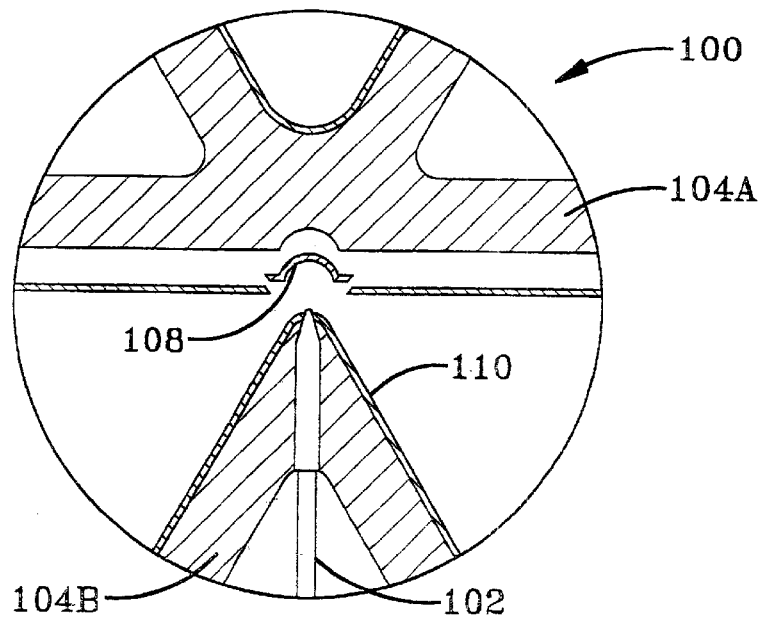
FIG. 8 is an enlarged, exploded view of the point of contact between a cup-shaped interconnect member and a nail current collector member.

FIG. 7 illustrates another embodiment of the stacked planar sheet configuration 80, including cup-shaped interconnects 88 and base members 90 for securing the nail current collector members 84 within the tubes of the planar sheets 82A, 82B. The assembly 80 may be rotated 180 degrees to provide even greater stability of the nail current collector members 84 within the fuel cell stack 80. FIG. 8 shows an enlarged, exploded view of the contact point 100 between a nail current collector member 102 positioned within a tube of a lower planar tube-sheet 104A and a cup-shaped interconnect strip 108 of an upper planar tube-sheet 104B. The nail current collector member 102 protrudes through the anode layer 110 of the of the lower planar tube-sheet 104B to make positive contact with the interconnect strip 108.

It is appreciated by those skilled in the art of electrochemical devices that the above described design may be useful in fuel cells, electrolysis cells, heat exchangers, chemical exchange apparatuses, and oxygen sensors, among other applications.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiments described explain the principles of the invention and practical applications and should enable others skilled in the art to utilize the invention in various embodiments and with various modifications as are suited to the particular use contemplated. While the invention has been described with reference to details of the illustrated embodiment, these details are not intended to limit the scope of the invention, rather the scope of the invention is to be defined by the claims appended hereto.

The embodiments of the invention in which an exclusive property or privilege is claimed are defined as follows:

1. A solid state fuel cell, comprising:
   a process gas flow passage having first and second active cathode-electrolyte-anode surfaces; and
   at least one nail current collector member traversing said gas flow passage for electronically connecting said first active surface to said second active surface, such that said nail current collector member facilitates the flow of electrons through said solid state fuel cell.

2. The solid state fuel cell recited in claim 1, further comprising insulating members disposed about said nail current collector member for electronically isolating said nail current collector member from cathode and electrolyte components of said active cathode-electrolyte-anode surface.

3. The solid state fuel cell recited in claim 1, further comprising a dielectric coating applied to said nail current collector member for isolating said nail current collector member from cathode and electrolyte components of said active cathode-electrolyte anode surfaces.

4. The solid state fuel cell recited in claim 1, wherein a plurality of nail current collector members are disposed along the length of said gas flow passage, and the distance between adjacent nail current collector members is approximately the diameter of the gas flow passage.

5. The solid state fuel cell recited in claim 1, further comprising a plurality of said solid state fuel cells assembled such that a nail current collector member traversing a gas flow passage of a first solid state fuel cell contacts an interconnect member of an adjacent, second solid state fuel cell.

6. The solid state fuel cell recited in claim 5, wherein the interconnect member has a concave surface to receive the protruding nail current collector member.

7. The solid state fuel cell recited in claim 1, wherein said two active cathode-electrolyte-anode surfaces are each a composite of layers of cathode, electrolyte, and anode material, and said anode layer increases in thickness in the direction of current flow through the solid state fuel cell and said cathode layer decreases in thickness in the direction of current flow through the solid state fuel cell.

8. A solid state fuel cell assembly, comprising:
   a substantially horizontal and planar sheet comprised of a cathode material and having a first edge, an opposing second edge, a top surface and a bottom surface;
   a plurality of parallel, linear oxidant gas passages formed within said sheet, each oxidant gas passage having an exterior surface, a first open end at the first edge of said sheet and a second open end at the second edge of said sheet, the exterior surfaces of said oxidant gas passages creating protruding ridges in the top surface of said sheet along the lengths of said oxidant gas passages;

a first electrolyte coating applied to the top surface of said sheet;

a first anode coating applied to said first electrolyte coating;

a plurality of interconnect strips applied to the bottom surface of said sheet, said interconnect strips having a first end at the first edge of said sheet and a second end at the second edge of said sheet, said interconnect strips being positioned between adjacent oxidant gas passages;

a second electrolyte coating applied to the bottom surface of said sheet and between said interconnect strips;

a second anode coating applied to said second electrolyte coating;

at least one electronically conducting member disposed within one of said oxidant gas flow passages of a sheet, said electronically conducting member having a first end in contact with said first anode coating and a second, opposing end in contact with said second anode coating of said sheet;

a plurality of said sheets stacked together, such that said oxidant gas passages of adjacent sheets are parallel, and the ridges of a lower sheet are in contact with the interconnect strip of an adjacent upper sheet; and fuel gas passages are formed between adjacent sheets.

9. The solid state fuel cell assembly recited in claim 8, wherein said plurality of oxidant gas passages have cross-sections selected from geometries consisting of triangles, trapezoids, polygons, and rectangles.

10. The solid state fuel cell assembly recited in claim 8, further comprising at least one nail current collector member disposed within one of said oxidant gas flow passages of a sheet, said nail current collector member having a first end in contact with said first anode coating and a second, opposing end in contact with said second anode coating of said sheet.

11. The solid state fuel cell assembly recited in claim 10, further comprising an insulating member for electronically isolating said nail current collector member from the cathode material of said sheet and said first and second electrolyte coatings.

12. The solid state fuel cell assembly recited in claim 10, further comprising a dielectric coating applied to any surface of said nail current collector member traversing the cathode material of said sheet and said first and second electrolyte coatings.

13. The solid state fuel cell assembly recited in claim 10, wherein said nail current collector member protrudes from said first anode coating and contacts said interconnect strip of an adjacent sheet.

14. The solid state fuel cell assembly recited in claim 13, wherein said interconnect strip has a concave surface for receiving the nail current collector member at the point of contact between said protruding nail current collector member and said interconnect strip.

15. The solid state fuel cell assembly recited in claim 10, wherein a plurality of said nail current collectors are disposed along the length of said oxidant gas flow passage, and the distance between adjacent nail current collector members is approximately the diameter of the gas flow passage.

16. The solid state fuel cell assembly recited in claim 8, wherein current flows from a lower sheet to an adjacent upper sheet via the interconnect and said first anode coating increases in thickness in the direction of current flow through the solid state fuel cell assembly.

17. The solid state fuel cell assembly recited in claim 8, wherein current flows from a lower sheet to an adjacent upper sheet via the interconnect and said cathode material decreases in thickness in the direction of current flow through the solid state fuel cell assembly.

18. A solid oxide fuel cell, comprising:

an anode layer;

a cathode layer;

an electrolyte layer disposed between said anode and cathode layer;

a current path traversing the cathode, electrolyte, and anode layers, wherein electrons travel through the solid oxide fuel cell in the direction of the current path, and wherein said anode layer increases in thickness along said current path and said cathode layer decreases in thickness along said current path.

19. A solid oxide fuel cell, comprising:

a process gas flow passage having first and second active cathode-electrolyte-anode surfaces; and at least one electronically conducting member traversing said gas flow passage for electronically connecting said first active surface to said second active surface, such that said electronically conducting member facilitates the flow of electrons through said solid state fuel cell.

20. A solid oxide fuel cell, comprising:

an anode layer;

a cathode layer;

an electrolyte layer disposed between said anode and cathode layer; and a current path traversing the cathode, electrolyte, and anode layers, wherein electrons travel through the solid oxide fuel cell in the direction of the current path, and wherein said anode layer increases in thickness along said current path.

21. A solid oxide fuel cell, comprising:

an anode layer;

a cathode layer;

an electrolyte layer disposed between said anode and cathode layer; and a current path traversing the cathode, electrolyte, and anode layers, wherein electrons travel through the solid oxide fuel cell in the direction of the current path, and wherein said cathode layer decreases in thickness along said current path.

* * * * *